United States Patent [19]
Grothen

[11] Patent Number: 5,613,641
[45] Date of Patent: Mar. 25, 1997

[54] CENTER PIVOT IRRIGATION CONTROL SYSTEM

[76] Inventor: Phillip Grothen, Rte. 1, Box 16A, Juniata, Nebr. 68955

[21] Appl. No.: 377,554

[22] Filed: Jan. 24, 1995

[51] Int. Cl.⁶ ........................................ B05B 3/18
[52] U.S. Cl. ............................. 239/731; 239/733
[58] Field of Search ........................... 239/731, 733

[56] References Cited

U.S. PATENT DOCUMENTS

| | | | |
|---|---|---|---|
| 3,386,661 | 6/1968 | Olson | 239/731 |
| 3,628,729 | 12/1971 | Thomas | 239/729 |
| 3,692,045 | 9/1972 | Carr | 239/344 |
| 3,704,827 | 12/1972 | Moulton | 239/731 |
| 3,713,296 | 1/1973 | Black | 239/731 X |
| 3,937,237 | 2/1976 | Boone et al. | 239/1 |
| 4,135,539 | 1/1979 | Hunter et al. | 239/731 X |
| 4,155,679 | 5/1979 | Cornelius et al. | 415/29 |
| 5,305,958 | 4/1994 | Olson | 239/733 |

*Primary Examiner*—Lesley D. Morris
*Attorney, Agent, or Firm*—Henderson & Sturm

[57] ABSTRACT

A hydraulic control apparatus for hydraulically powered center pivot irrigation systems which utilizes dual-spool, four-way hydraulic valves for controlling the movement of inner support towers, and a pressure controlled directional valve with a dedicated high pressure line to control the direction and speed of the outer tower and hence of the entire system. One of the spools controls the clockwise movement of the irrigation system, while the second spool controls system movement in the counter clockwise direction. Should an inner support tower malfunction and fail to move, the outer sections can be driven back into realignment by simply reversing the hydraulic pressure in the two primary lines.

6 Claims, 6 Drawing Sheets

CENTER PIVOT IRRIGATION CONTROL SYSTEM

TECHNICAL FIELD

This invention relates to center pivot irrigation systems, and more particularly to a control system for hydraulically driven center pivot irrigation systems.

BACKGROUND ART

Center pivot irrigation systems are well known in the art and are generally comprised of a central source of water about which an elongated radial water distribution pipe rotates. The pipe, which carries a number of sprinklers along its length, is elevated above the ground by a series of support towers which have wheels and therefore travel in large circles about the center pivot point.

The support towers are generally driven by water pressure, by electric motors, or by hydraulic motors. Regardless of the propulsion means, it is critical that the elongate conduit remain in a straight line as it rotates about the center point in order to keep from bending or breaking the conduit. This is accomplished by constantly adjusting the speed of each of the support towers. Obviously, the outermost tower has the furthest distance to travel and therefore must travel the fastest, with each succeeding inward tower traveling slightly slower.

Most systems utilize a "follow the leader" system in which the movement of each tower is controlled by the tower just outward from it. Consider a hydraulically powered center pivot irrigation system having a total of three towers extending from a center pivot. Pivoting is begun by applying hydraulic pressure to one of two hydraulic lines extending to each tower from a central pump. A hydraulic motor at the outermost, or third, tower receives pressure and begins to drive the tower. As this third tower moves forward, the third section of conduit begins to become misaligned with the second section since the second tower has not yet moved. This misalignment is translated into a linear movement by means of a pivot arm or bell crank attached to the outer conduit section which in turn repositions a hydraulic valve on the second tower. Repositioning the second tower hydraulic valve provides hydraulic pressure to the second tower hydraulic motor and it then begins to move. If, for some reason the second tower drive means should fail or the tower should get stuck, the valve moves past the drive position and into a bypass position where fluid bypasses the motor and is diverted back into the return line. This tends to equalize pressure in the two hydraulic lines and all tower movement stops. In order to realign the conduit, the farmer must generally disconnect the valve on the stalled second tower and move it from the bypass position to the neutral position in order to get hydraulic pressure to the outer tower to drive it back into line. When that is accomplished, he must then return to the second tower and reconnect the hydraulic valve.

Direction of rotation of prior art systems is controlled by pressurizing one or the other of the two hydraulic lines extending to the support towers. Speed of movement is a function of the hydraulic pressure supplied to the system.

DISCLOSURE OF THE INVENTION

The present invention discloses a hydraulic control apparatus for center pivot irrigation systems which utilizes dual-spool, four-way, multiple position hydraulic valves for controlling the movement of inner support towers, and a pressure controlled directional valve with a dedicated high pressure line to control the direction and speed of the outer tower and hence of the entire system. One of the spools controls the clockwise or forward movement of the irrigation system, while the second spool controls system movement in the counter clockwise or reverse direction. Should an inner support tower malfunction and fail to move, the outer sections can be driven back into realignment by simply reversing the hydraulic pressure in the two primary lines.

BRIEF DESCRIPTION OF THE DRAWINGS

These and other attributes of the invention will become more apparent upon a thorough study of the following description of the best mode for carrying out the invention, particularly when reviewed in conjunction with the drawings, wherein.

BEST MODE FOR CARRYING OUT THE INVENTION

Figure 1:
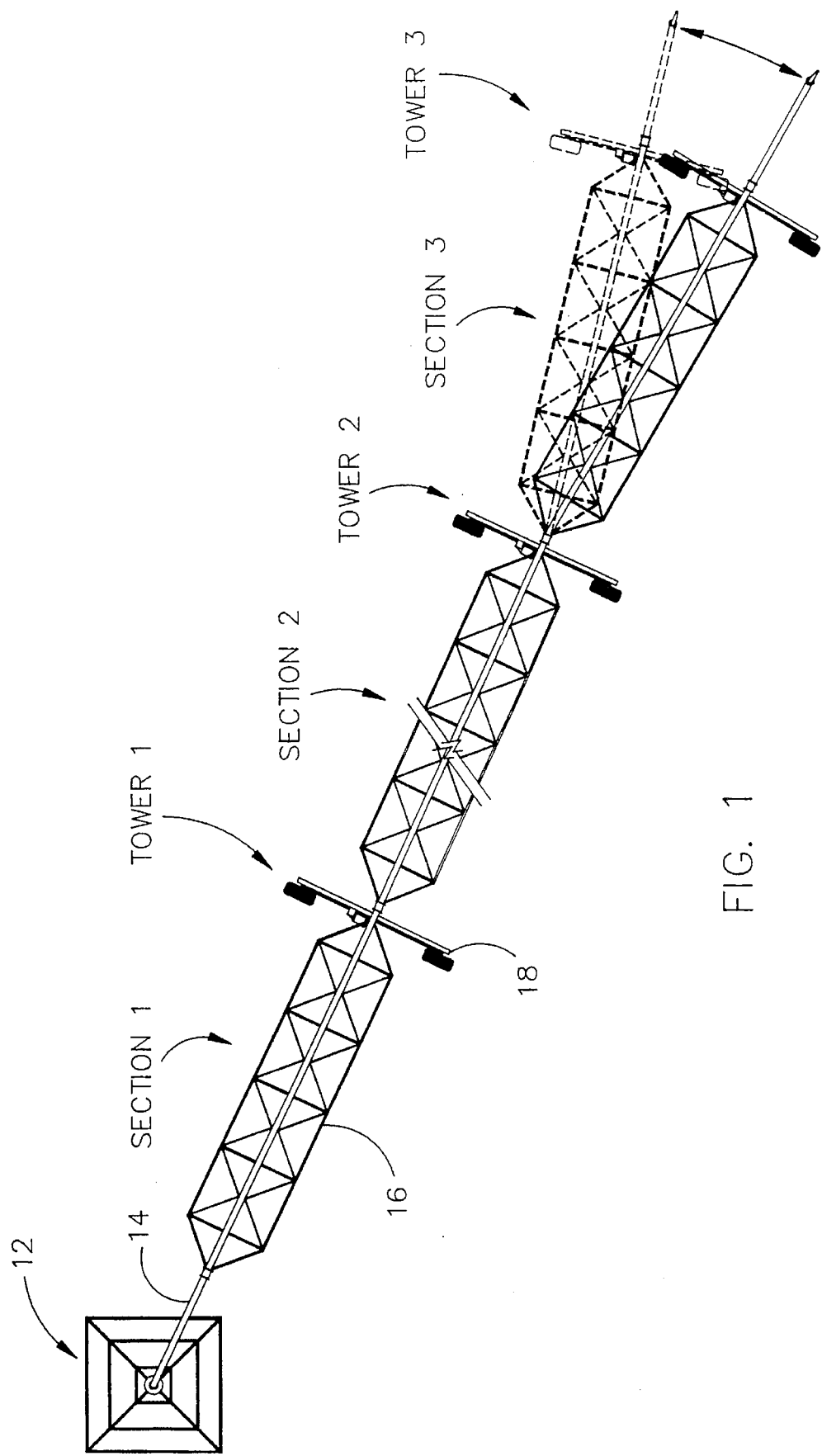
FIG. 1 is a top plan view of a simplified center pivot irrigation system utilizing three support towers.
Figure 2:
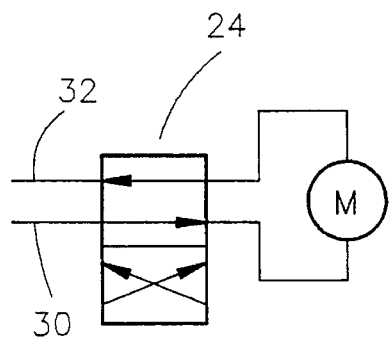
FIG. 2 depicts a schematic diagram of a basic four-way, two position valve of the prior art.

Referring now to the drawings, wherein like reference numerals designate identical or corresponding parts throughout the several views, FIG. 1 is a top plan view of a standard center pivot irrigation system, well known in the art. A simplified three section, three tower system is shown for explanation purposes and comprises a central source of water 12, about which rotates an elevated water conduit 14 which is supported by truss sections 16 and transported in a circle around the central water source by wheeled support towers 18.

A requirement in center pivot irrigation systems is to maintain the water conduit in a straight line as the system pivots about the central water source. Furthermore, there must be some way of stopping the entire system should a support tower fail to move due to some malfunction such as perhaps a broken drive motor. Referring to FIG. 1, if for example tower 2 malfunctioned and tower 3 continued to move, the water conduit would soon break.

The standard method for maintaining conduit alignment is to utilize a "follow the leader" approach, with each tower following its adjacent outer tower. In the prior art system depicted in FIGS. 2 through 7, a centrally located hydraulic pump delivers hydraulic pressure to hydraulic motors through four-way, five-position hydraulic valves 20 located at each of the inner towers 1 and 2, and to a hydraulic motor through a reversible valve 24 at the outer tower 3. As hydraulic pressure is applied to the tower 3 motor through hydraulic line 30, the tower begins to move in a clockwise direction about the center pivot point. This initial motion produces a misalignment between section 3 and section 2 which is detected by pivot arm 34 which is pivotally secured to tower 2 and to section 3. As the outer tower 3 moves further clockwise, pivot arm 34 pivots and drives the spool of valve 20 to the position shown in FIG. 4, allowing high pressure hydraulic fluid to reach and ddve the tower 2 motor. Tower 2 thus follows the movement of tower 3. Should tower 2 stop moving due to a malfunction or due to getting stuck, the pivot arm 34 will drive the valve 20 to the position depicted in FIG. 5. In this position high pressure hydraulic fluid is bypassed from line 30 into line 32. This position thus removes hydraulic pressure from the tower 2 motor and equalizes the pressure in hydraulic lines 30 and 32, which stops the tower 3 motor and prevents further misalignment.

Figure 3:
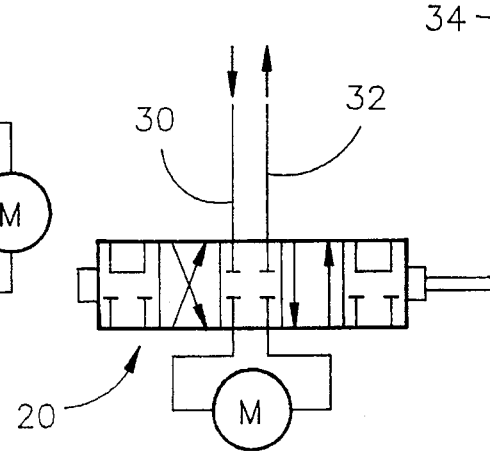
FIG. 3 depicts the basic four-way, five position valve of the prior art in the neutral position.
Figure 4:
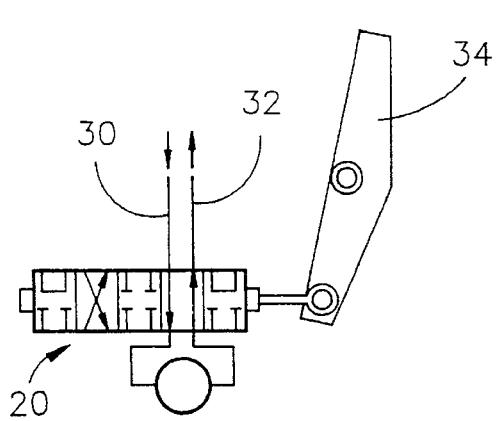
FIG. 4 depicts the basic four-way, five position valve in the clockwise drive position.
Figure 5:
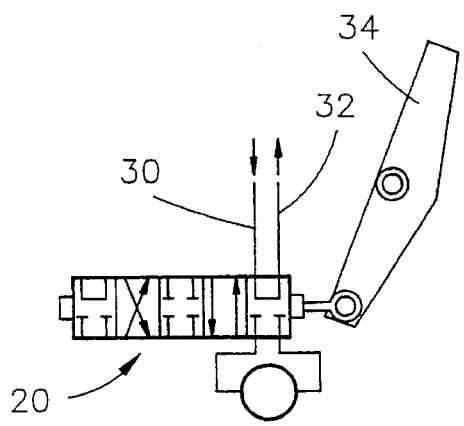
FIG. 5 depicts the basic four-way, five position valve in the clockwise bypass position.
Figure 6:
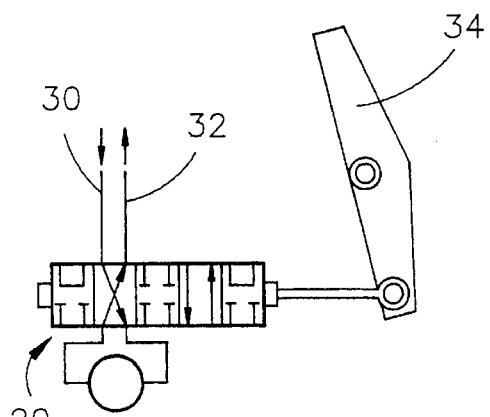
FIG. 6 depicts the basic four-way, five position valve in the counterclockwise drive position.
Figure 7:
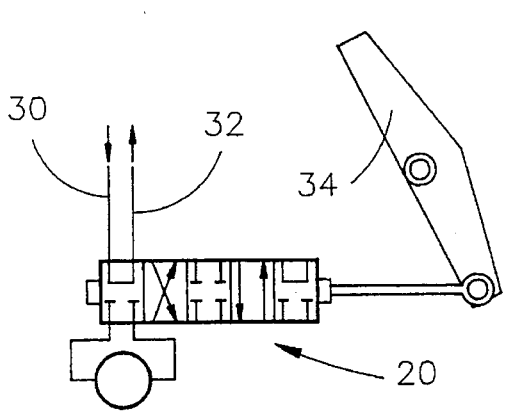
FIG. 7 depicts the basic four-way, five position valve in the counterclockwise bypass position.

In order for the operator to realign the conduit, he must first disconnect the tower 2 valve and move it from the bypass position of FIG. 5 to the neutral position of FIG. 3 in order to get high pressure back to tower 3. He must then reverse valve 24 on tower 3, and then apply pressure to drive tower 3 back into alignment. The tower 2 valve then must be reconnected after the malfunction is corrected. FIGS. 6 and 7 show the valve positions when the system is operated in the counterclockwise direction.

Figure 8:
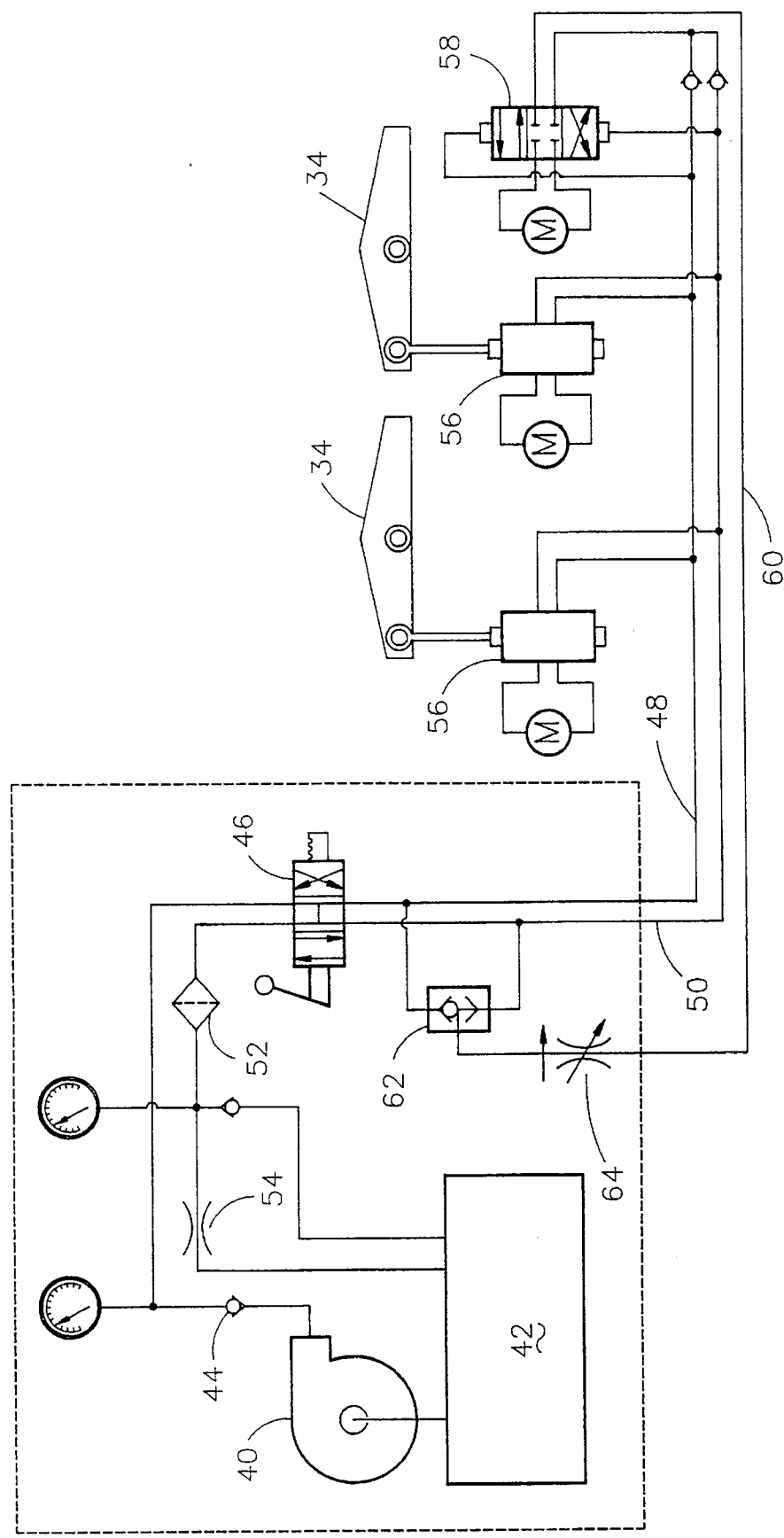
FIG. 8 depicts a hydraulic schematic diagram of the complete drive and control system of the present invention for a three tower center pivot irrigation system.

The control system of the present invention for a three tower center pivot irrigation system is depicted in FIG. 8. Obviously many more towers are ordinarily used, but this number is sufficient for purposes of explanation. A hydraulic pump 40 supplies high pressure hydraulic fluid from oil reservoir 42 through a pump outlet check valve 44 to main direction valve 46, a manually operated 4-way open center valve which selects the direction of rotation of the irrigation system by pressurizing either clockwise (CW) line 48 or counterclockwise (CCW) line 50. In either case, the non-pressurized line acts as a return line, passing through a filter 52 and a restrictor orifice 54, the size of which is dependent on system length.

Hydraulic lines 48 and 50 extend along the length of the system to dual-spool, four-way control valves 56 at each of the inner towers and to a four-way, three position pilot operated direction valve 58 at the outer tower. The outer tower valve 58 also receives a dedicated speed control hydraulic line 60 which is pressurized by line 48 or 50 through shuttle valve 62 and pressure compensated flow control valve 64 which controls the speed of the outer tower. Thus, pilot pressure from the CW drive line 48 will shift the spool of valve 58 to allow hydraulic fluid from speed control line 60 to drive the outer tower hydraulic motor in a clockwise direction with the CCW line 50 acting as a return line. If the CCW line 50 is pressurized, the spool of valve 58 will shift so as to allow speed control line 60 to ddve the outer tower hydraulic motor in a counterclockwise direction with the CW line 48 acting as a return.

Figure 9:
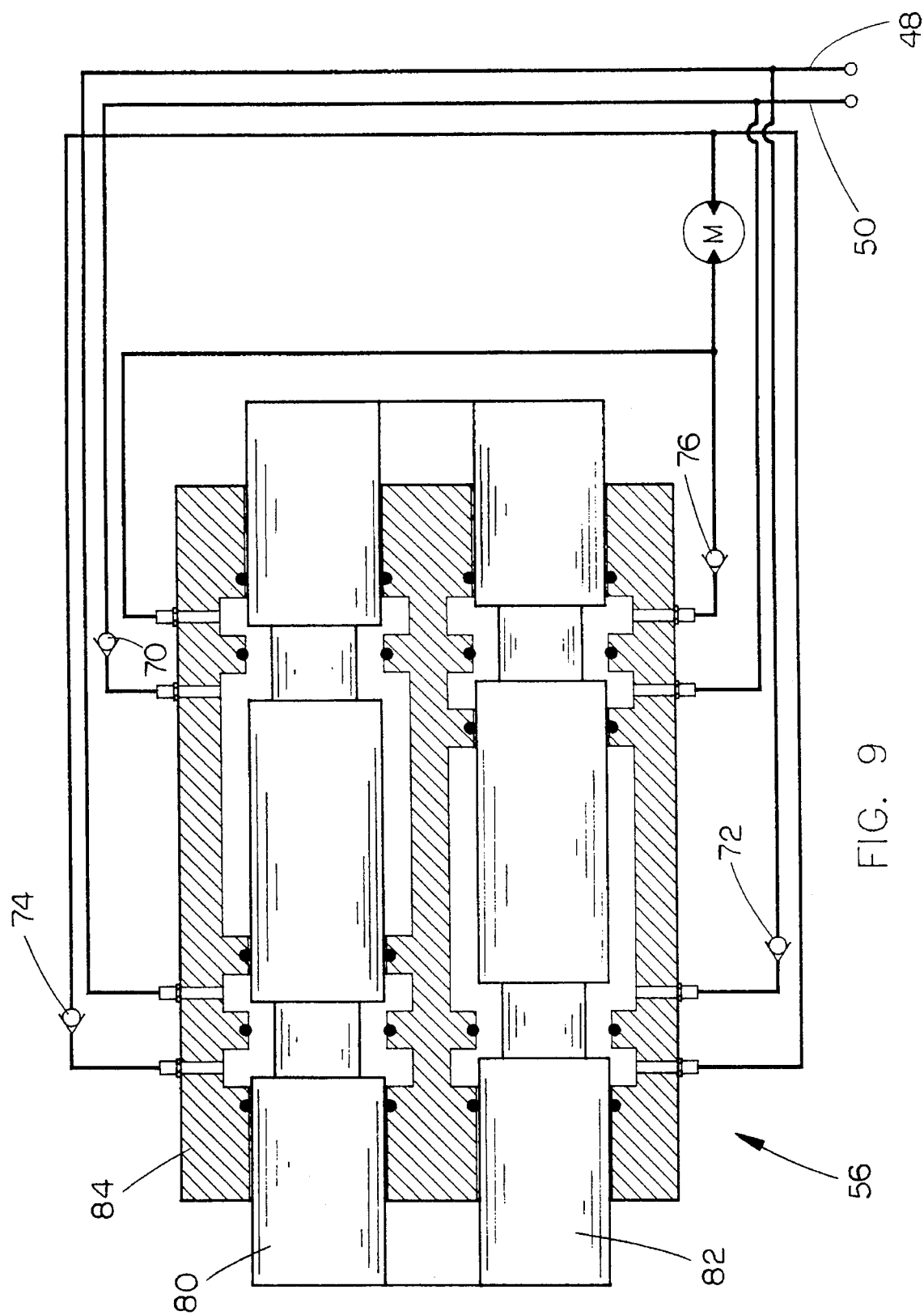
FIG. 9 is a cross-sectional view of the dual-spool valve of the invention.
Figure 14:
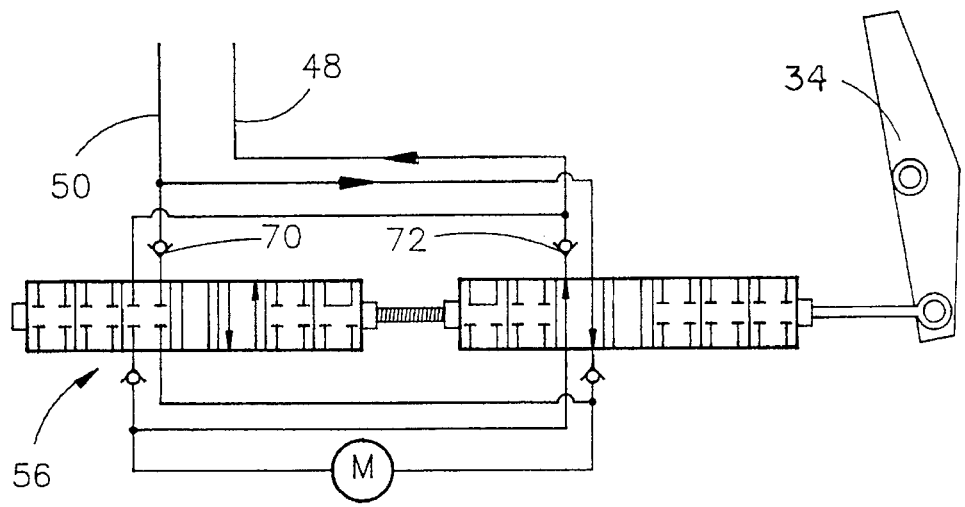
FIG. 14 depicts the valve of the present invention in the counter-clockwise drive position.
Figure 15:
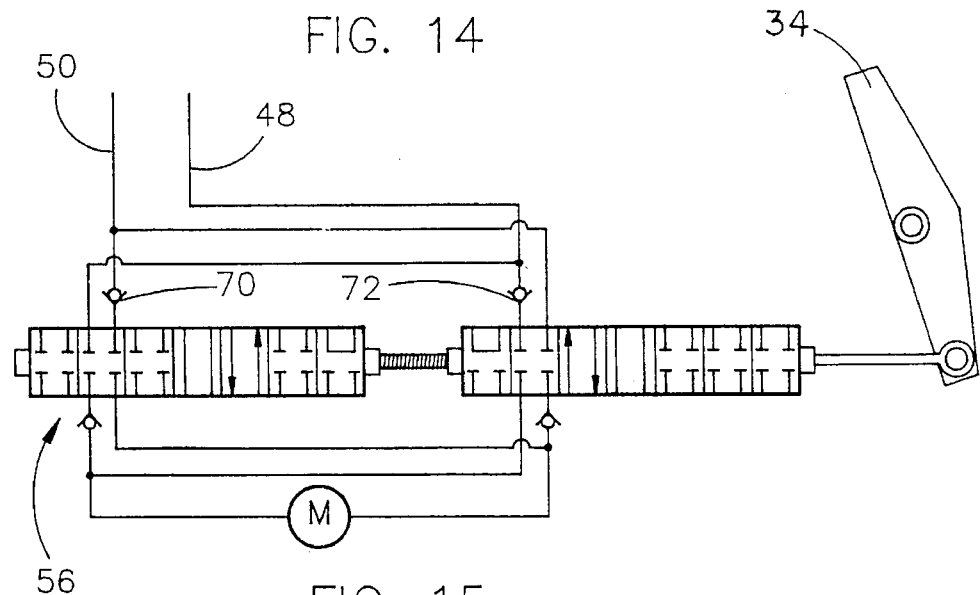
FIG. 15 depicts the valve of the present invention in the counter-clockwise pause position.

The dual-spool, four way valve of the invention is depicted in cross-section in FIG. 9 and comprises a valve housing 84 carrying a CW or forward spool 80, a CCW or reverse spool 82, and one-way check valves 70, 72, 74, 76. The two spools 80, 82 are mechanically connected and function together to control the flow of hydraulic fluid through the valve and to the hydraulic motor as will be more fully described below. In the position depicted in FIGS. 9 and 10, the valve is in the neutral position, which will allow for motor functioning and hence tower movement if either the CW hydraulic line 48 or the CCW hydraulic line 50 is pressurized. This allows tower movement to begin before the next outer tower shifts the drive spools 80, 82 to the drive position of FIGS. 11 and 14 and therefore prevents excessive bowing of the water conduit which occurs if each tower must wait until its adjacent outer tower first gets ahead a sufficient amount to command movement.

Figure 10:
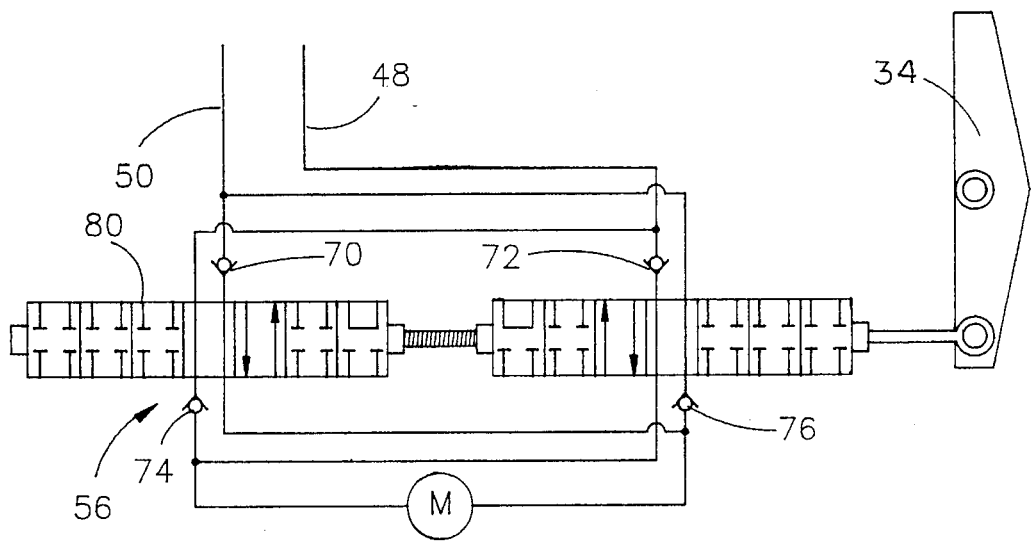
FIG. 10 depicts a schematic diagram of the valve of the present invention in the neutral position.
Figure 11:
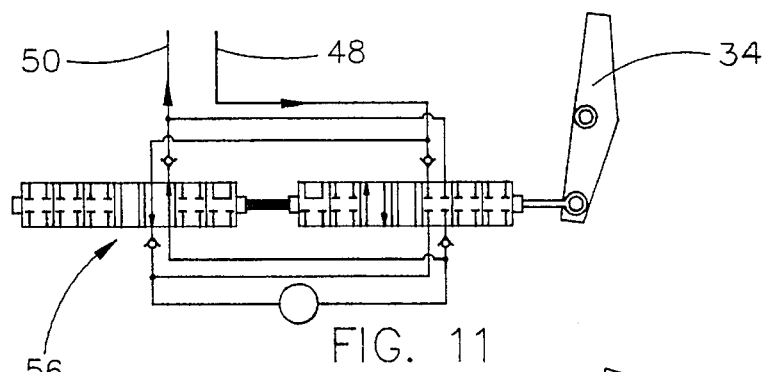
FIG. 11 depicts the valve of the present invention in the clockwise drive position.
Figure 12:
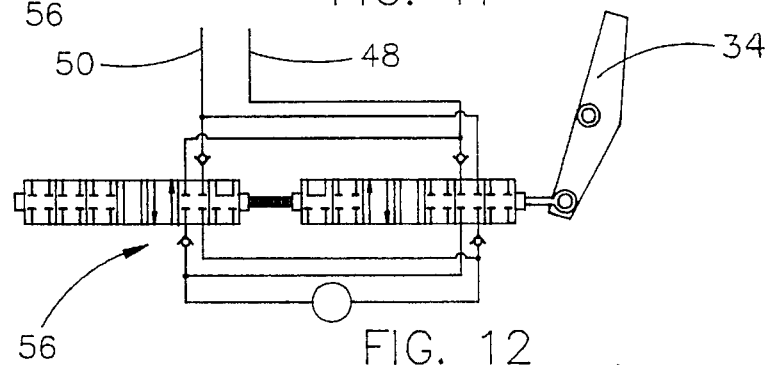
FIG. 12 depicts the valve of the present invention in the clockwise pause position.
Figure 13:
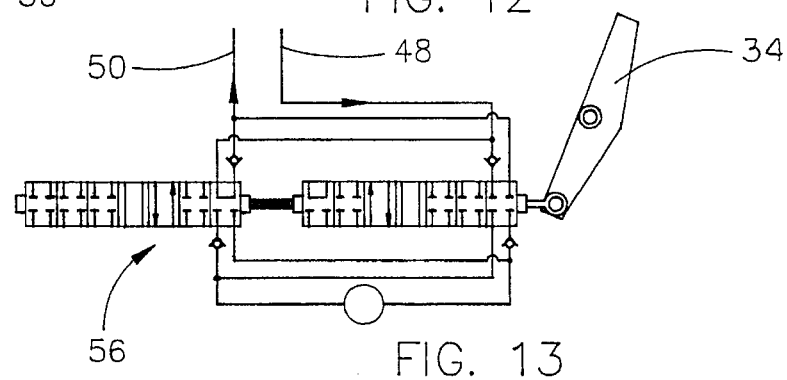
FIG. 13 desists the valve of the present invention in the clockwise bypass position.

Referring now to FIGS. 1 and 8–13, movement in the CW direction is initiated by directing high pressure through CW line 48 by means of main direction valve 46. This pressure drives the spool of valve 58 to the CW position and permits the introduction of high pressure to the outer tower hydraulic motor by means of flow control valve 64 and speed control line 60. Pressure is also applied through line 48 to each motor on the interior towers by means of their respective valves 56 as depicted in FIG. 10. As the towers begin to move, misalignment may be created between, for example, sections 2 and 3 as tower three gets ahead of tower 2. This misalignment will be detected by pivot arm 34 which is pivotally attached to tower 2 and to section 3. As tower 3 moves ahead of tower 2, the pivot arm 34 drives the CW spool 80 of the valve 56 to the drive position shown in FIG. 11. In these Figures, the clockwise drive spool 80 is to the left and the counterclockwise ddve spool 82 is to the right. As depicted in FIG. 11, high pressure will be metered from CW line 48 through the valve 56, to the hydraulic motor, and out return line 50. If tower 2 should malfunction or get stuck, tower 3 would get so far ahead as to ddve the spool 80 first to the stop position of FIG. 12, and then to the bypass position depicted in FIG. 13. In this configuration, the tower 2 hydraulic motor is bypassed and the tower 3 hydraulic motor will stop due to the equalization of hydraulic pressure in lines 48 and 50.

To realign the system, the operator can simply reverse the main direction valve 46. This action directs high pressure through CCW line 50, causing the spool of valve 58 to move to the CCW position and drive the tower 3 motor in the CCW direction. During the realignment of tower 3, tower 2 remains stationary since the CCW spool 82 is closed. When tower 3 is realigned and the malfunction of tower 2 is fixed, the irrigation system can continue to be driven in the CCW direction by pressurizing CCW line 50. The tower 2 control valve 56 positions in this situation are shown in FIGS. 10, 14, 15 & 16. As tower 3 moves CCW, misalignment between sections 2 and 3 is detected by pivot arm 34 and it begins to drive the spools of control valve 56 to the position shown in FIG. 14. In this position, high pressure hydraulic fluid from line 50 is metered by the CCW spool 82 to the motor and finally to return line 48. If tower 2 malfunctions, pivot arm 34 will drive the spools to the stop position shown in FIG.

Figure 16:
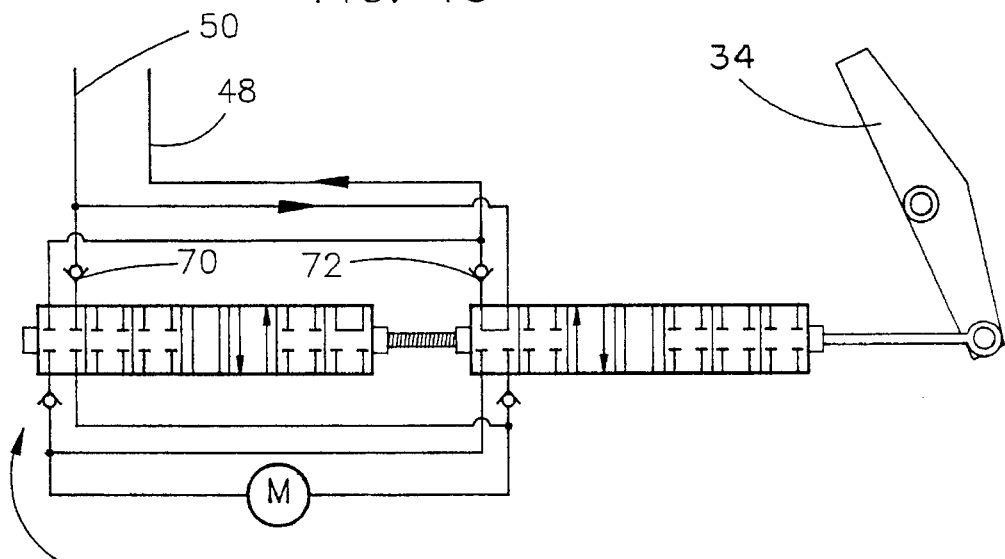
FIG. 16 depicts the valve of the present invention in the counter-clockwise bypass position.

15, and then to the bypass position shown in FIG. 16 where high pressure fluid is bypassed through spool 82 to the return line 48. This action shuts off the hydraulic motors of tower 2 and tower 3, stopping the entire irrigation system. Realignment is accomplished as described above, by reversing main direction valve 46. The motor of tower 2 remains off since the CW spool 80 of valve 56 is closed.

Obviously, many modifications and variations of the present invention are possible in light of the above teachings. It is therefore to be understood that, within the scope of the appended claims, the invention may be practiced otherwise than as specifically described.

What is claimed is:

1. In a center pivot irrigation system having an elongate conduit for supplying water under pressure to a plurality of sprinklers which is carried above the ground by a movable outer support tower and a plurality of movable inner support towers, and having a hydraulic drive system with a pump, a main direction valve, clockwise and counterclockwise control lines extending the length of said conduit, a hydraulic motor connected to drive means at each of said support towers, and means for sensing misalignment of the conduit at each inner support tower, a control apparatus comprising:

(a) clockwise valve means, located at each inner support tower and connected between said control lines and said hydraulic motor, for controlling the flow of hydraulic fluid from said clockwise control line in response to said misalignment sensing means;

(b) counterclockwise valve means, located at each inner support tower and connected between said control lines and said hydraulic motor, for controlling the flow of hydraulic fluid from said counterclockwise control line in response to said misalignment sensing means; and wherein said clockwise and counterclockwise valve means comprise means for sequentially (1) metering hydraulic fluid through said respective valve means to said respective hydraulic motors, (2) blocking hydraulic flow through said respective valve means and (3) bypassing hydraulic fluid between said control lines as said sensing means senses increasingly more misalignment between adjacent towers.

2. In a center pivot irrigation system having an elongate conduit for supplying water under pressure to a plurality of sprinklers which is carried above the ground by a movable outer support tower and a plurality of movable inner support towers, and having a hydraulic drive system with a pump, a main direction valve, clockwise and counterclockwise control lines extending the length of said conduit, a hydraulic motor connected to drive means at each of said support towers, and means for sensing misalignment of the conduit at each inner support tower, a control apparatus comprising:

(a) clockwise valve means, located at each inner support tower and connected between said control lines and said hydraulic motor, for controlling the flow of hydraulic fluid from said clockwise control line in response to said misalignment sensing means;

(b) counterclockwise valve means, located at each inner support tower and connected between said control lines and said hydraulic motor, for controlling the flow of hydraulic fluid from said counterclockwise control line in response to said misalignment sensing means; and a flow control valve connected to a speed control hydraulic line extending to a four-way, three-position pilot operated direction valve at the outer support tower, said pilot operated direction valve operably connected to said clockwise and counterclockwise control lines.

3. The control apparatus as recited in claim 2 wherein said clockwise and counterclockwise valve means comprise means for blocking hydraulic fluid flow through said valve, for metering hydraulic fluid through said valve to said hydraulic motors, and for bypassing hydraulic fluid between said control lines.

4. The control apparatus as recited in claim 3 wherein said each respective valve means comprises a dual-spool, four-way, four-position valve.

5. In a center pivot irrigation system having an elongate conduit for supplying water under pressure to a plurality of sprinklers which is carried above the ground by a movable outer support tower and a plurality of movable inner support towers, and having a hydraulic drive system with a pump, a main direction valve, clockwise and counterclockwise control lines extending the length of said conduit, a hydraulic motor connected to drive means at each of said support towers, and means for sensing misalignment of the conduit at each inner support tower, a control apparatus comprising:

(a) clockwise valve means, located at each inner support tower, for passing hydraulic fluid to said hydraulic motor when in a neutral position, for metering hydraulic fluid to said hydraulic motor when shifted to a drive position in response to said misalignment sensing means, for blocking hydraulic fluid flow to said hydraulic motor in further response to said misalignment sensing means, for bypassing said hydraulic motor in still further response to said misalignment sensing means, and for blocking hydraulic fluid flow from said counterclockwise drive line to said hydraulic motor;

(b) counterclockwise valve means, located at each inner support tower, for passing hydraulic fluid to said hydraulic motor when in a neutral position, for metering hydraulic fluid to said hydraulic motor when shifted to a drive position in response to said misalignment sensing means, for blocking hydraulic fluid flow to said hydraulic motor in further response to said misalignment sensing means, for bypassing said hydraulic motor in still further response to said misalignment sensing means, and for blocking hydraulic fluid flow from said clockwise drive line to said hydraulic motor; and means for controlling the speed of the outer support tower.

6. The control apparatus as recited in claim 5 wherein said speed controlling means comprises a flow control valve connected to a speed control hydraulic line extending to a four-way, three-position pilot operated direction valve at the outer support tower.

* * * * *